United States Patent
Clos (10) Patent No.: US 10,217,081 B2
(45) Date of Patent: Feb. 26, 2019

(54) PROXIMITY AUDITING OF STORAGE LIBRARY CARTRIDGE MAGAZINES

(71) Applicant: ORACLE INTERNATIONAL CORPORATION, Redwood City, CA (US)

(72) Inventor: Christopher John Clos, Westminster, CO (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 473 days.

(21) Appl. No.: 15/081,731

(22) Filed: Mar. 25, 2016

(65) Prior Publication Data

US 2017/0278050 A1  Sep. 28, 2017

(51) Int. Cl.
*G06Q 10/00* (2012.01)
*G06Q 10/08* (2012.01)
*G11B 17/00* (2006.01)
*B65G 1/04* (2006.01)

(52) U.S. Cl.
CPC ......... *G06Q 10/087* (2013.01); *B65G 1/0485* (2013.01); *G11B 17/00* (2013.01)

(58) Field of Classification Search
CPC ..... G06Q 10/087; G06Q 10/202; G11B 17/00
USPC .......................................................... 705/28
See application file for complete search history.

(56) References Cited

U.S. PATENT DOCUMENTS

| | | | |
|---|---|---|---|
| 5,814,171 A | 9/1998 | Manes et al. | |
| 6,213,705 B1* | 4/2001 | Wilson | G11B 15/68 414/274 |
| 7,474,497 B2* | 1/2009 | Jesionowski | G11B 15/6835 360/92.1 |
| 8,855,808 B2 | 10/2014 | Ostwald et al. | |
| 9,153,281 B2 | 10/2015 | Hill et al. | |
| 2013/0302116 A1* | 11/2013 | Hill | G11B 15/6835 414/275 |

* cited by examiner

*Primary Examiner* — Rokib Masud
(74) *Attorney, Agent, or Firm* — Marsh Fischmann & Breyfogle LLP; Kent A. Lembke; Daniel J. Sherwinter (57) ABSTRACT

Embodiments are described for proximity auditing of removable media cartridge magazines in a data storage library. For example, a proximity sensor mounted on a robotic assembly can be used to detect one or more target features of cartridge magazines. In particular, the proximity sensor can look for relatively large structural features of a removable cartridge magazine in a manner that is fast and reliable, and does not rely on precise positioning of the robotic assembly with respect to the magazine. Some implementations can use the proximity sensor in conjunction with further auditing and/or other functions of line camera, and/or other sensors of the robotic assembly. Proximity-based auditing of the magazines can permit storage library systems to initialize faster and with more reliable inventory information.

24 Claims, 7 Drawing Sheets

PROXIMITY AUDITING OF STORAGE LIBRARY CARTRIDGE MAGAZINES

FIELD

Embodiments relate generally to data storage library systems, and, more particularly, to use of proximity sensors for storage library cartridge magazine detection.

BACKGROUND

Storage library systems are often used by enterprises and the like to efficiently store and retrieve data from storage media. In the case of some storage libraries, the media are data cartridges (e.g., tape cartridges) that are typically stored and indexed within a set of magazines. When particular data is requested, a specialized robotic mechanism finds the appropriate cartridge, removes the cartridge from its magazine, and carries the cartridge to a drive that is designed to receive the cartridge and read its contents. Some storage libraries have multiple drives that can operate concurrently to perform input/output (IO) operations on multiple cartridges.

Operation of the robotic mechanism in the context of a data storage system typically involves a number of different location related tasks. For example, the robotic mechanism may be used for targeting of specific locations within the data storage system, for performing pick and place operations on media cartridges, for reading barcodes and/or other symbols or features, for auditing the existence and/or absence of media cartridges in magazines or drives, etc. Each of these and other operations can be frustrated when location-related errors are introduced into the environment if proper corrective feedback is not provided. For example, errors can easily be introduced into the system from physical jarring or manipulation of components, from compounding of errors inherent in electronic components, etc.

Some such operations can relate to auditing of inventory locations. For example, inventory locations can include media cartridge storing cells provided in a stacked arrangement (in a magazine) for convenient storage of large numbers of media cartridges. Performing a tape audit in a storage library system can involve distinguishing between unlabeled cartridges or magazines (or errors in the detection system) and empty cell or magazine locations. Some conventional systems perform such audits by either having the robotically actuated hand assembly reach into cells or other locations mechanically to sense whether a cartridge or magazine is present, or by using the robot to read barcodes or other labels. Extending the robotically actuated hand assembly into many locations for auditing purposes can add significant delay to the audit time, and reading labels can add cost and error (and often complex calibration processes).

BRIEF SUMMARY

Among other things, systems and methods are described for proximity auditing of removable media cartridge magazines in a data storage library. For example, a proximity sensor mounted on a robotic assembly can be used to detect one or more target features of cartridge magazines. In particular, the proximity sensor can look for relatively large structural features of a removable cartridge magazine in a manner that is fast and reliable and does not rely on precise positioning of the robotic assembly with respect to the magazine. Some implementations can use the proximity sensor in conjunction with further auditing and/or other functions of a line camera and/or other sensors of the robotic assembly. Proximity-based auditing of the magazines can permit storage library systems to initialize faster and with more reliable inventory information.

According to one set of embodiments, a system is provided for auditing removable cartridge magazines in a storage library system. The system includes: a robotic assembly operable to ferry media cartridges in the storage library system; a proximity sensor integrated with the robotic assembly; and a processor. The robotic assembly can move the proximity sensor to search for a structural feature that is present when a corresponding removable cartridge magazine is installed in an installation location of the storage library system. The processor has a proximity sensor input and a cartridge audit output. The cartridge audit output indicates presence of the corresponding removable cartridge magazines in the installation location in response to detection of the structural feature by the proximity sensor.

According to another set of embodiments, a method is provided for auditing removable cartridge magazines in a storage library system. The method includes: moving a proximity sensor to an audit location in the storage library system, the proximity sensor being integrated with a robotic assembly operable to ferry media cartridges in the storage library system and the audit location corresponding to an installation location for a removable cartridge magazine; searching, with the proximity sensor, for a structural feature that is present only when a corresponding removable cartridge magazine is installed in the installation location; and outputting a cartridge presence indication in response to the searching, the cartridge presence indication indicating the corresponding removable cartridge magazine is installed in the installation location when the structural feature is found, and the cartridge presence indication indicating the corresponding removable cartridge magazine is not installed in the installation location when the structural feature is not found.

According to another set of embodiments, another system is provided for auditing removable cartridge magazines in a storage library system. The system includes a processor in communication with a proximity sensor integrated with a robotic assembly operable to ferry media cartridges in the storage library system, and a data store having instructions stored thereon. When executed, the instructions cause the processor to perform steps including: searching, with the proximity sensor, for a structural feature that is present only when a corresponding removable cartridge magazine is installed in an installation location; and outputting a cartridge presence indication in response to the searching, the cartridge presence indication indicating the corresponding removable cartridge magazine is installed in the installation location when the structural feature is found, and the cartridge presence indication indicating the corresponding removable cartridge magazine is not installed in the installation location when the structural feature is not found.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
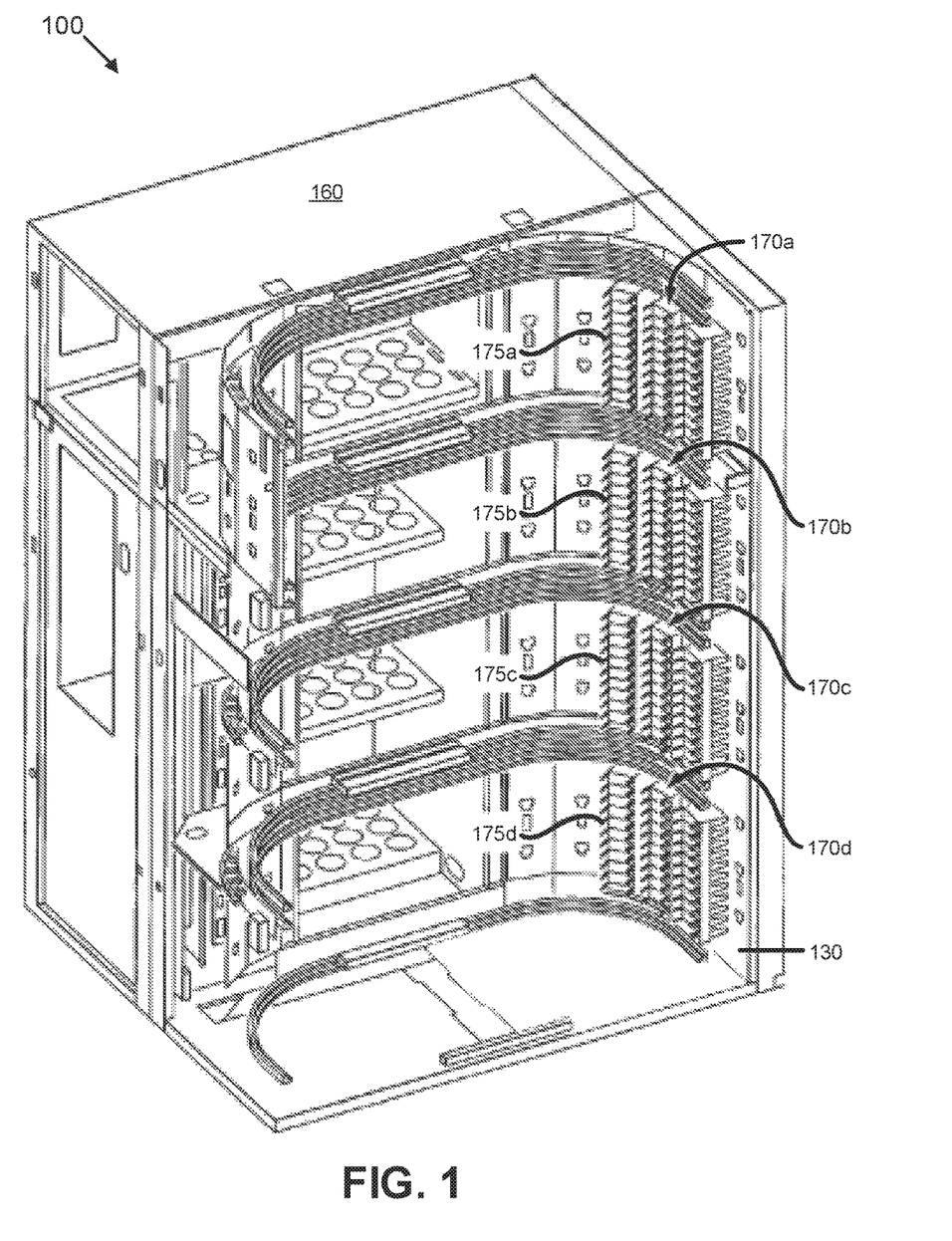
FIG. 1 shows an illustrative storage library system as a context for various embodiments.

FIG. 1 shows an illustrative storage library system 100 as a context for various embodiments. The storage library system 100 can be an automated tape library, such as the SL8500 Modular Library System produced by Oracle Corporation. Embodiments are not intended to be limited to any particular type or implementation of automated tape library system and may apply in context of any suitable storage library system 100. Generally, embodiments are directed to auditing presence and/or absence of cartridge magazines in such storage library systems 100. Such storage library systems 100 can include a large number of media cartridges (e.g., storage tapes) that have data stored thereon. The media cartridges are physically maintained within the library's chassis 160 in cartridge magazines 170. For example, the cartridge magazines 170 can include an array of magazine cells 175, each adapted to hold a media cartridge. Some cartridge magazines 170 can be permanently attached to the library's chassis 160, and other cartridge magazines 170 can be removable from the library's chassis 160. For example, some cartridge magazines 170 can be used by a library operator to import and/or export cartridges (e.g., in hulk) to and/or from the storage library system 100.

Such storage library systems 100 typically also include one or more robotic mechanisms (not shown) that have pick and place mechanisms (e.g., a robotic "hand"). The robotic mechanisms can move throughout the storage library system 100 (e.g., on rails or other structures) between cartridge magazines 170, banks of tape drives in the storage library system 100, and/or other locations in the storage library system 100. For example, the robotic mechanisms can be used to locate a desired media cartridge in its magazine cell 175, remove the media cartridge from the magazine cell 175, terry the media cartridge to a media drive (e.g., a tape drive), and place the media cartridge in the media drive for performance of data input/output operations. Typically, such storage library systems 100 operate under operational requirements, including that the storage library system 100 continue to function, even when one or more removable cartridge magazines 170 are not installed. Further, certain operations of the storage library systems 100 can involve detection and/or knowledge of whether one or more removable cartridge magazines 170 are present. For example, the storage library systems 100 can include an auditing or inventory phase of operation, during which a determination is made as to which cartridge magazines 170 are present or absent, which magazine cells 175 are full or empty, which media cartridges are present, etc.

Some conventional approaches to detection of cartridge magazines 170 use a line or barcode scanner. In some cases, cartridge magazines 170 can include target features that are used to calibrate an X-Y position for accurate positioning of the robot with respect to a particular cartridge magazine 170, and a camera (or other suitable device) on the hand is used to look for, and at, those target features. For example, the target features can include a visible pattern, formed by a set of injection-molded tapered raised ribs with a foil pattern heat stamped onto the ribs to form the visible pattern, by an adhesive-backed label with a visible pattern displayed thereon applied to an inside portion of each cell, or by any other suitable manner. In some conventional implementations, an attempt is made first to find a cartridge magazine 170 by locating its target feature. If the target is not found, there can additionally be a special "No Magazine" barcode label (or other type of special label) attached to the library's chassis 160 behind where the magazine mounts (e.g., a storage wall 130) and the camera can then be used to look for the "No Magazine" barcode label. If the "No Magazine" label is seen by the camera, the storage library system 100 can log that cartridge magazine 170 as "not present" (or any suitable designation). Thus, some implementations can use the targeting to determine whether a cartridge magazine 170 is present, to accurately position the robotic hand with respect to the cartridge magazine 170, and/or to audit magazine cells 175 of the cartridge magazine 170 (e.g., to determine if a magazine cell 175 is full or empty, to identify its contents, etc.).

However, such a conventional approach can yield errors in some cases, such as when the camera fails to see the target features and then fails to see the "No Magazine" label. It can be difficult (e.g., or expensive, etc.) to implement the camera to reliably read both kinds of targets, as they may be in appreciably different focal planes. For example, the target features may be on a front side of the cartridge magazines 170 that is relatively close to the camera, while the "No Magazine" label may be on the storage wall 130 relatively far from the camera (behind where the cartridge magazines 170 would be if present). Such a combined failure can mean that no cartridge magazine 170 is present, but the camera failed to successfully find or read the "No Magazine" label; or that a cartridge magazine 170 is present, but the camera failed to successfully find or read the magazine target features; or a the camera is not functioning properly; etc. For example, some such conventional approaches can make multiple attempts to read the magazine target feature (even though there may be no cartridge magazine 170), which can take appreciable amounts of time and can still result in an erroneous result.

Embodiments described herein seek to improve the speed and/or reliability of auditing (e.g., inventory) processes for storage library systems 100. As described herein, a proximity sensor mounted on the robot's hand can be used to detect one or more target features of the cartridge magazines 170. Some implementations use the proximity sensor to look for the magazine target features before any attempts are made to look for the target features with a line camera, barcode scanner, or the like. As noted above, the camera can typically be optimized to read targets and barcode labels attached to tape cartridges, and the like, so that the "No Magazine" label may be out of its focal plane (e.g., 4 inches farther away from the camera). In contrast, though the robot's proximity sensor may be unable to read any target features, embodiments can use the proximity sensor to detect target features in a more optimized manner, including with more reliability and/or in less time. This can permit the storage library systems 100 to initialize faster and with more reliable inventory information. In some embodiments, the storage library systems 100 can be implemented without "No Magazine" labels (or the like), which can reduce cost and/or provide other features.

Figure 2:
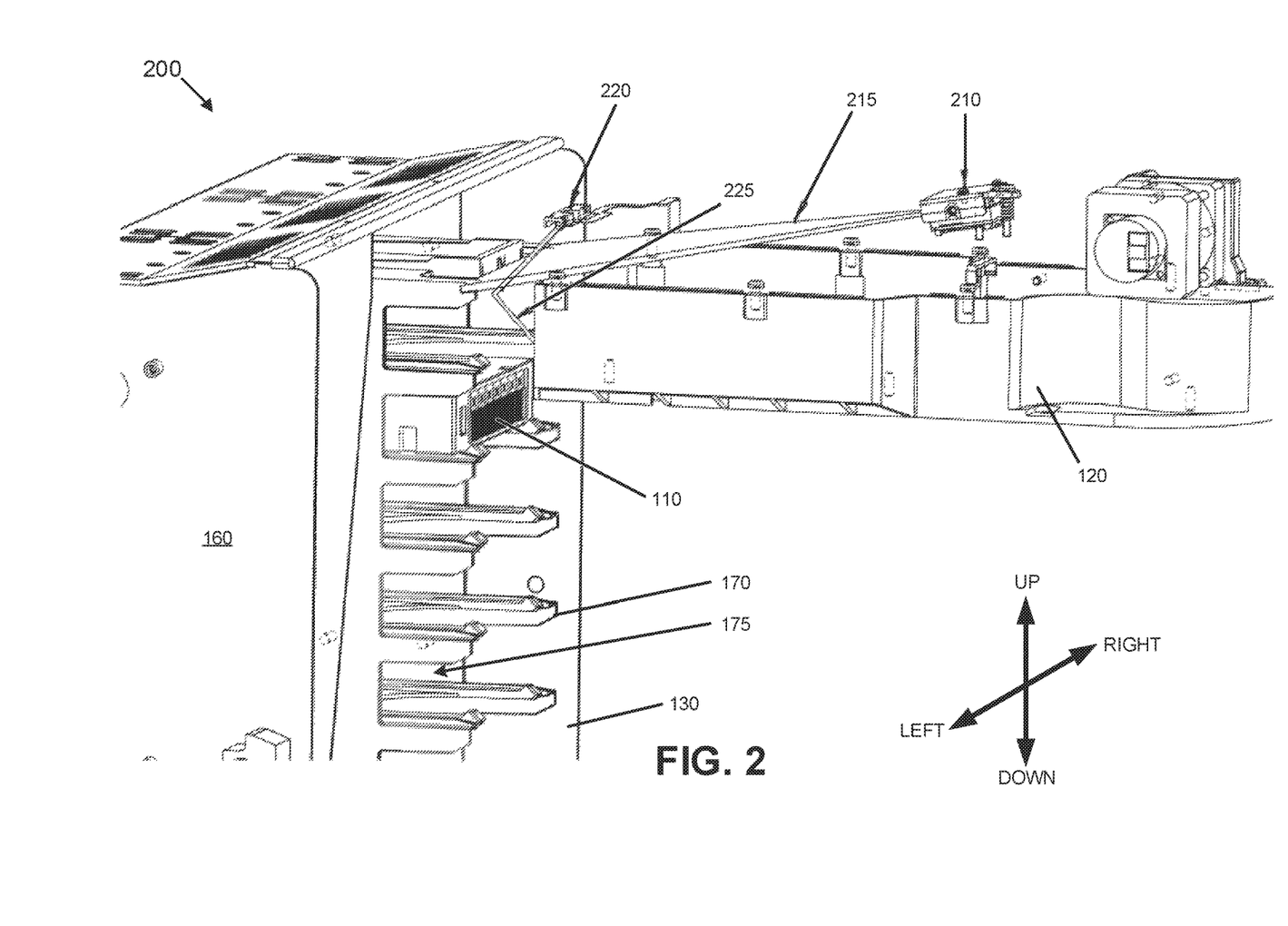
FIG. 2 shows an illustrative portion of a storage library system having a partial library chassis and a robotic assembly, according to various embodiments.

FIG. 2 shows an illustrative portion of a storage library system 200 having a partial library chassis 160 and a robotic assembly 120, according to various embodiments. The library chassis 160 houses a storage wall 130 shown as having a cartridge magazine 170 with one media cartridge 110 in a corresponding magazine cell 175. As described above, the robotic assembly 120 can move throughout the storage library system 200 to perform media cartridge 110 related tasks, such as pick and place tasks, media cartridge 110 auditing tasks, cartridge magazine 170 auditing tasks, etc. For example, the robotic assembly 120 can move in up, down, left, and right directions, as indicated by arrows in FIG. 2.

Some of the tasks of the robotic assembly 120 can rely on sensor feedback data from one or more sensors of the robotic assembly 120. The illustrated robotic assembly 120 includes a line camera 210 and a proximity sensor 220. The line camera 210 can be a barcode scanner, camera, and/or the like mounted on the hand of the robotic assembly 120 to read barcodes and/or other specialized features. In one implementation, the line camera 210 on the robotic hand can include an LED board with multiple surface-mounted lights to light up a surface to be read by the line camera 210, a charge-coupled device (CCD) chip (e.g., or any photosensitive chip, for example, with a horizontal slit to distinguish light and dark lines on a projected image), a lens and/or other optics to project an image from a pattern to be read by the line camera 210 onto the CCD chip, and a computational system for controlling the line camera 210 and processing the image pattern (e.g., deciphering the pattern). An example of an illumination footprint 215 is shown as an illustrative region over which the line camera 210 is able to obtain optical information (e.g., imagery). The far edge of the illumination footprint 215 can correspond to an illustrative focal plane of the line camera 210. As shown, the line camera 210 can be designed with a focal plane corresponding substantially to a distance between the line camera 210 and features of interest (e.g., an "N" target and/or cartridge barcode, as described below). Notably, the back of the storage wall 130 (e.g., the region behind where a cartridge magazine 170 would be) can typically be out of the focal plane of the line camera 210.

Embodiments of the proximity sensor 220 can include an optical source and an optical sink arranged in an optical relationship with one another. For example, the optical sink can be mounted to the robotic assembly 120 above the optical source, and both can be focused and/or pointed in such a way that the optical sink can sense optical signals originating from the optical source and reflecting off a surface. An illustrative optical path 225 shows how a transmitted optical signal could reflect off an object and back to an optical sink of the proximity sensor 220 if a proximate object were present. A threshold optical response magnitude can be selected so that reflected optical signals exceeding the magnitude correspond to objects within a certain distance of the optical source and/or optical sink. For example, by sensing a reflected optical signal having a magnitude exceeding the threshold, the proximity sensor 220 can determine the presence of an object "in proximity" to the proximity sensor 220. In some conventional libraries, such a proximity detector can detect presence of a media cartridge 110. Embodiments described herein use the proximity sensor 220 to detect particular features of cartridge magazines 170, for example, for use in cartridge magazine auditing. Embodiments of the proximity sensor 220 can sense optical signals reflected directly by the desired features of the cartridge magazines 170 when present, so that there is a clearly discernable difference in optical response between presence or absence of such a feature in proximity to the proximity sensor 220. For example, presence of the feature can cause an optical signal from the optical source to reflect back to the optical sink to a sufficient degree to manifest an optical response exceeding the threshold optical response magnitude; while absence of the feature can cause the optical signal from the optical source to fail to reflect back to the optical sink at all, or at least to reflect back poorly, so as to manifest an optical response falling below the threshold optical response magnitude. Some implementations of the proximity sensor 220 can be positioned, angled, optically filtered, optically masked, focused, electrically and/or optically tuned, and/or otherwise configured to manifest the desired threshold response to the desired target features.

Though not explicitly shown, embodiments include one or more components and/or processors (e.g., in the proximity sensor 220, in the robotic assembly 120, in the storage library system 200, etc.) to determine whether the optical response of the proximity sensor 220 exceeds the threshold optical response magnitude. In some embodiments, there can be a large variation in intensity of the transmitted optical signals from the optical source (e.g., one or more LEDs). For example, the optical signal intensities can vary as much as −50%/+100%, and the received reflections can vary in intensity by corresponding amounts. In such embodiments, detection can be unreliable when comparing the widely varying intensities to a fixed threshold. Accordingly, some implementations use a varying (e.g., dynamic) threshold optical response magnitude. For example, the processor(s) can be used to compare the optical signal received by the optical sink of the proximity sensor 220 with a reference signal, and the reference signal can be configured dynamically to respond to the variations in optical intensity. For example, reference signal intensity can be proportional to the optical signal intensity.

Figure 3:
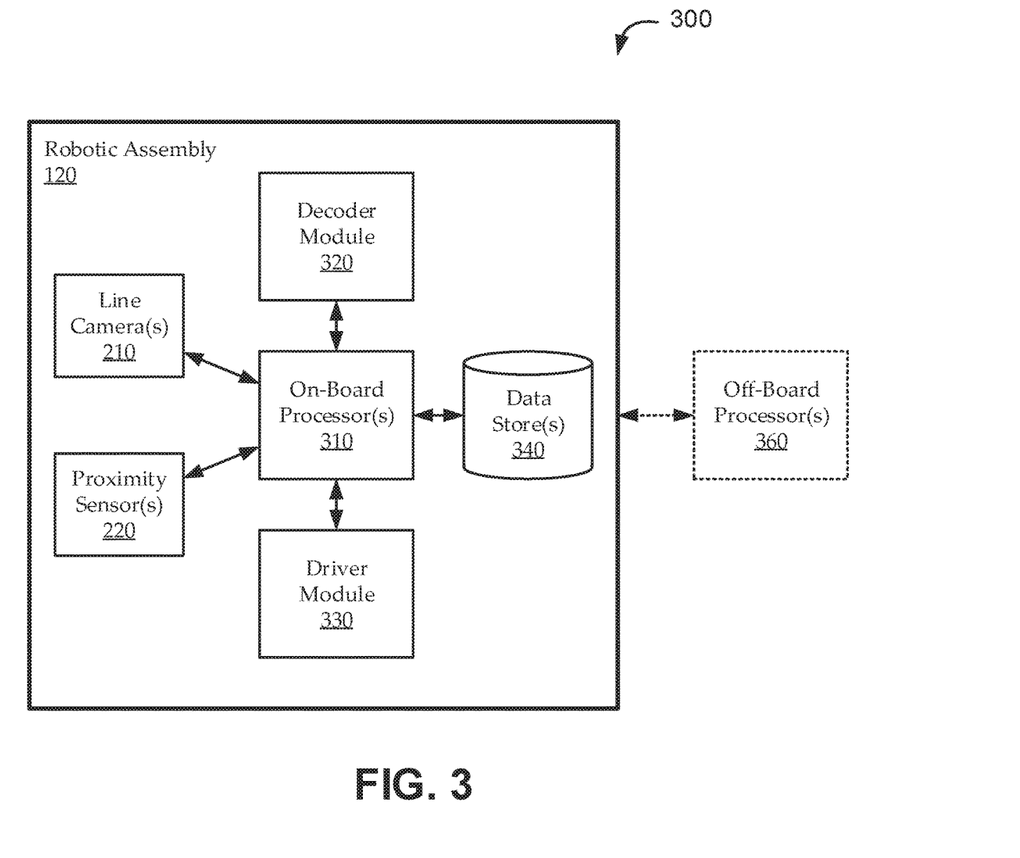
FIG. 3 shows a simplified block diagram that includes an illustrative robotic assembly 120, according to various embodiments.

FIG. 3 shows a simplified block diagram 300 that includes an illustrative robotic assembly 120, according to various embodiments. The robotic assembly 120 has a number of functional blocks, including one or more line cameras 210, one or more proximity sensors 220, one or more on-board processors 310, a decoder module 320, a driver module 330, and one or more data stores 340. In some embodiments, the robotic assembly 120 is in communication with one or more off-board processors 360. For example, the on-board processor(s) 310 can include dedicated and/or general-purpose processing circuitry integrated with the robotic assembly 120 to assist with performing its functions; and the off-board processors 360 can include the main and/or other processors of the storage library system, or any other controller external to the robotic assembly 120. In some implementations, some or all of the processing functionality is removed from the robotic assembly 120 (i.e., performed by the off-board processors 360. For example, functionality of one of more component blocks shown in FIG. 3 can be implemented as instructions (e.g., software, firmware, etc.) that cause one or more processors of the data storage system, when executed, to implement such functions.

Embodiments of the robotic assembly 120 can be used effectively as a carriage for the line camera(s) 210 and/or proximity sensor(s) 220. For example, movement of the robotic assembly 120 can be directed by the driver module 330 and can be used to effectively move and/or point the line camera(s) 210 and/or proximity sensor(s) 220 at desired locations. As described above, the proximity sensor 220 can be pointed, so that a transmitted optical signal (e.g., an LED light) can reflect off an object in particular proximity to the sensor and can be received by the proximity sensor 220 at a signal level indicating presence or absence of the proximate object. In alternative implementations, determination of presence or absence of a proximate object can involve detecting and/or analyzing characteristics of the received signal, such as the timing, wavelength, etc. of the reflected signal. Accordingly, features of the proximity sensor(s) 220 can be directed by the on-board processors 310 and/or off-board processors 360, and/or can be impacted by data maintained in the data store(s) 340.

As described herein, embodiments can use the proximity sensor 220 for a threshold detection of presence and/or absence of a cartridge magazine 170. Such detection can involve the proximity sensor 220 determining whether a relatively coarse (e.g., large) magazine target feature is in proximity to the proximity sensor 220, for example, without concern for decoding or otherwise interpreting the detected feature. The detection with the proximity sensor 220 can be used in conjunction with detection (e.g., and/or decoding, etc.) by the line camera 210. In some embodiments, the proximity sensor 220 is used to quickly determine whether a cartridge magazine 170 is present in an audit location of a storage wall 130. If the cartridge magazine 170 appears to be present, the line camera 210 can be used to look for the "N" target 420 and/or other targeting features. The further detection by the line camera 210 can facilitate orientation of the robotic assembly 120 with respect to the detected cartridge magazine 170, etc. In some implementations, optical information received by the line camera 210 can be decoded by decoder module 320. For example, the decoder module 320 can receive contrast data, topographic data, imagery, etc. from the line camera 210 and can decode the data to obtain information about the detected target feature (e.g., to identify an edge of a geometric feature, to decode a barcode, to find and/or decode a particular symbol, etc.). In some alternative embodiments, the proximity sensor 220 is used to audit cartridge magazines 170 only in response to a particular result of conventional auditing by a line camera 210. For example, in the event that auditing by the line camera 210 is inconclusive (e.g., no "N" target 420 of a cartridge magazine 170 is detected, but a "No Magazine" label 410 is also not seen), the proximity sensor 220 can be used (e.g., rather than iterating multiple times with the line camera 210).

In some embodiments, as described above, the processor (e.g., the on-board processors 310 and/or off-board processors 360) is in communication with the proximity sensor(s) 220 integrated with the robotic assembly 120. The data store(s) 340 can include instructions stored thereon, which, when executed, cause the processor to perform steps. The steps can include: searching, with the proximity sensor(s) 220, for a structural feature that is present only when a corresponding removable cartridge magazines 170 is installed in an installation location (e.g., of a storage wall 130); and outputting a cartridge presence indication in response to the searching. The cartridge presence indication can indicate that the corresponding removable cartridge magazine 170 is installed in the installation location when the structural feature is found, and the cartridge presence indication can indicate that the corresponding removable cartridge magazine is not installed in the installation location when the structural feature is not found. In some such embodiments, the steps further include moving the proximity sensor(s) 220 to an audit location prior to the searching (e.g., the audit location corresponds to the installation location for the removable cartridge magazine 170). Some embodiments are implemented so that the searching steps include transmitting an optical signal from an optical source of the proximity sensor(s) 220, and detecting receipt of the optical signal by an optical sink of the proximity sensor(s) 220 after reflection of the optical signal off an object (e.g., the structural feature) in proximity to the proximity sensor(s) 220. For example, such searching can include determining whether the optical signal is received by the optical sink at a magnitude exceeding a threshold level, where the threshold level can be set so that the magnitude of the received optical signal exceeds the threshold level only when the structural feature is present within a predefined distance range from the proximity sensor(s) 220. In some embodiments, the steps can further cause the processor to direct the line camera 210 to optically profile a target feature (e.g., the "N" target 420) of the structural feature in response to the cartridge presence indication indicating the corresponding removable cartridge magazine 170 is installed in the installation location. For example, the optical profiling can involve imaging and/or otherwise obtaining sufficient optical information to recognize and/or decode the target feature.

Figure 4:
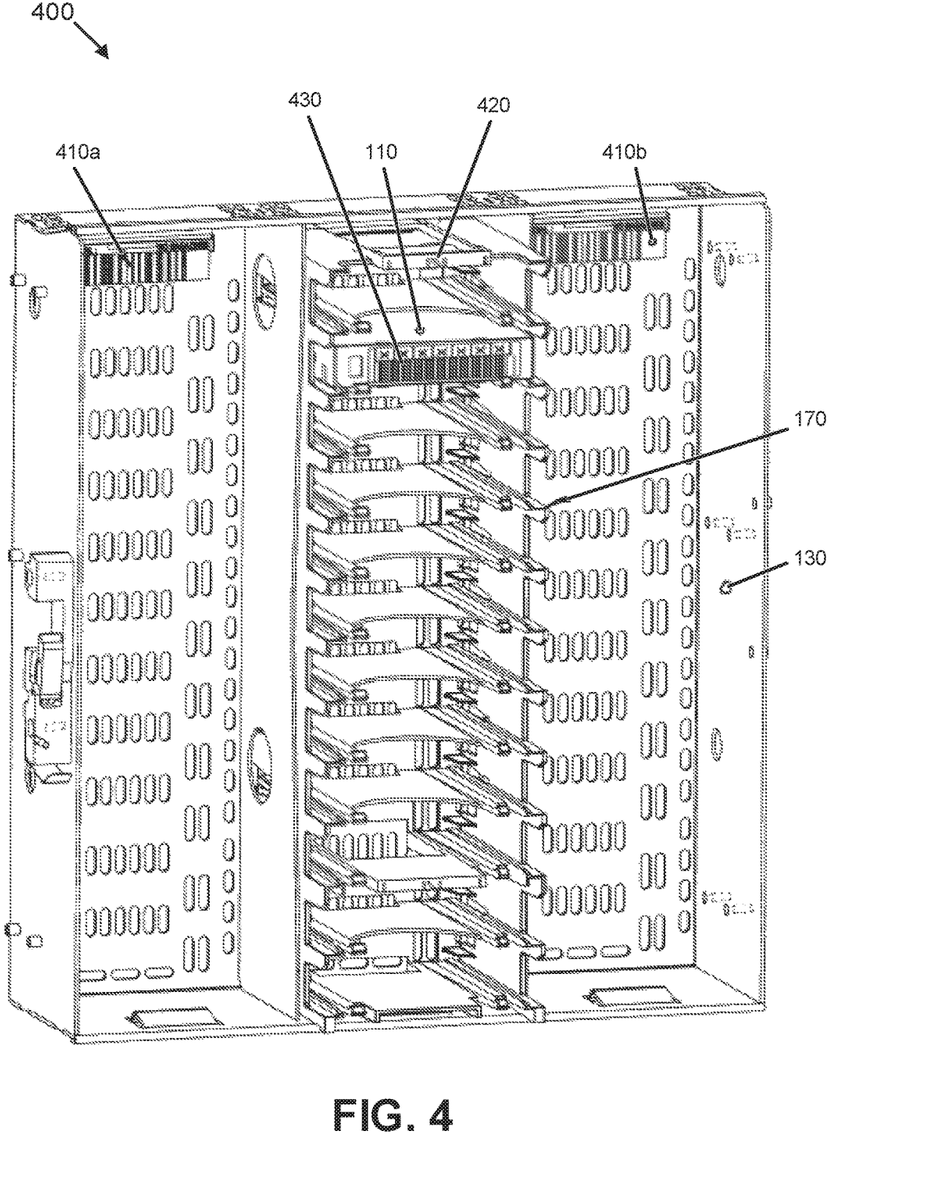
FIG. 4 shows another partial storage library system having an illustrative library chassis with a storage wall, according to various embodiments.

FIG. 4 shows another partial storage library system 400 having an illustrative storage wall 130, according to various embodiments. As shown, the storage wall 130 has space for three cartridge magazines 170, and each cartridge magazine 170 has twelve magazine cells 175 for holding media cartridges 110. Some conventional storage library systems 400 include multiple types of targeting features that can have different uses. In the illustrative storage wall 130, each location for a cartridge magazine 170 can include a "No Magazine" label 410. The "No Magazine" label 410 can be affixed to the storage wall 130 so that it is visible to one or more sensors of the robotic assembly 120 when no cartridge magazine 170 is present in that location, and so that it is hidden behind a cartridge magazine 170 when a cartridge magazine 170 is present in the location. Some storage library systems 400 also include an "N" target 420, or the like, on each cartridge magazine 170. For example, the "N" target 420 can be a plastic target integrated into each cartridge magazine 170 and shaped with features (e.g., precise straight and angled lines substantially arranged in an 'N' shape) that can facilitate precise positioning of the robotic assembly 120 with respect to the cartridge magazine 170. Some storage library systems 400 can also include cartridge barcode labels 430 and/or other targeting features.

As described above, the storage library system 400 can include a robotic assembly 120 with a line camera 210. The line camera 210 is conventionally used to read and interpret labels, such as the "No Magazine" labels 410 (shown as a barcode), the "N" targets 420, the cartridge barcode labels 430, etc. The line camera 210 is typically used for such tasks because the optical information it receives can be decoded for interpreting barcode data, for precision locating of the robotic assembly 120, etc. However, as noted above, the line camera 210 can typically be optimized for a particular focal plane (it may be too expensive or otherwise impractical or undesirable to design the camera with multiple or adjustable focal planes), so that the line camera 210 may not be capable of reliably reading targeting features (e.g., barcodes) in multiple focal planes. For example, the line camera 210 can be optimized to read cartridge barcode labels 430 and "N" targets 420, both of which may be appreciably closer than the "No Magazine" labels 410 on the a storage wall 130 (e.g., four inches closer to the line camera 210). Accordingly, the "No Magazine" label 410 may be out of the focal plane of the line camera 210 and may not be reliably read in some cases. For example, in operation, the line camera 210 can be used conventionally to determine whether a cartridge magazine 170 is present by looking for the "N" target 420. If the "N" target 420 is not found, the line camera 210 can look for the "No Magazine" label 410. However, poor focus and/or other line camera 210 issues can cause a false response. For example, features of the "No Magazine" label 410 can be misinterpreted as features of the "N" target 420, neither the "N" target 420 nor the "No Magazine" label 410 can be detected, etc. In these and other cases, it can be uncertain whether there is or is not, in fact, a cartridge magazine 170; or if, alternatively, there is a problem with the line camera 210 and/or its data. Some conventional approaches attempt to find the cartridge magazine 170 multiple times, seeking to mitigate false results. However, such approaches can still yield false results if there is an issue with the line camera 210, and/or can cause auditing of cartridge magazines 170 to take an undesirably long time.

While the line camera 210 can enable performance of tasks by detecting and interpreting target features, the proximity sensor 220 of the robotic assembly 120 can typically only determine whether there is something in proximity thereto. For example, the proximity sensor 220 is typically used to detect whether a magazine cell 175 is occupied or empty in response to detecting whether something or nothing is in a particular magazine cell 175 location, respectively. However, such a detection typically still relies on the line camera 210, for example, to have previously oriented the robotic assembly 120 (and thereby the proximity sensor 220) to the cartridge magazine 170. Thus, because of the inability of the proximity sensor 220 to read and interpret target features like the "N" target 420, and the resulting inability of the proximity sensor 220 to precisely orient the robotic assembly 120 to a cartridge magazine 170, the proximity sensor 220 has not conventionally been used to audit cartridge magazines 170. As described herein, embodiments use the proximity sensor 220 in the auditing of cartridge magazines 170, at least to provide a threshold determination of whether a cartridge magazine 170 is present. Some embodiments can be implemented without "No Magazine" labels 410. For example, the auditing can be performed by the proximity sensor 220, after which the line camera 210 can be used to locate the "N" target 420 (or other suitable feature) for orienting the robotic assembly 120 and/or enabling other tasks.

Figure 5:
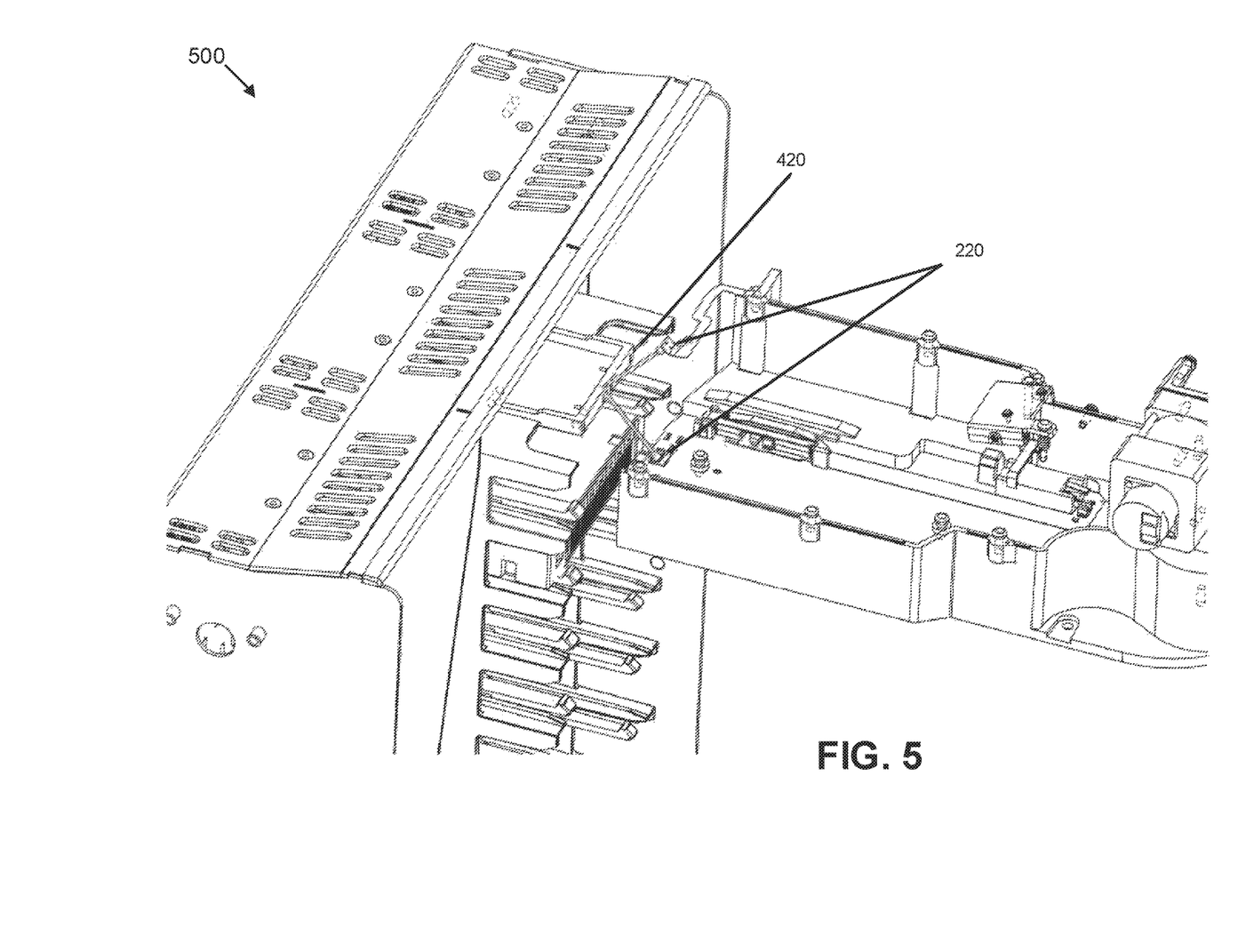
FIG. 5 shows an illustrative portion of a storage library system, such as the one shown in FIG. 2.

FIG. 5 shows an illustrative portion of a storage library system 500, such as the one shown in FIG. 2. In particular, the proximity sensor 220 of the robotic assembly 120 is shown positioned to detect presence of a cartridge structural feature. For example, the cartridge magazines 170 can have a structural feature at one or both ends that can include the "N" target 420. As shown, the structural feature is relatively large (e.g., relatively thick and wide) and can appreciably protrude from surrounding structure. Such a feature can easily be detected by a proximity sensor 220 without precise location of the robotic assembly 120. This can be in contrast to thin structural edges and/or other relatively small features, which may easily be missed by the proximity sensor 220 when the robotic assembly 120 is slightly misaligned with respect to the cartridge magazines 170 and/or the storage wall 130.

Figure 6:
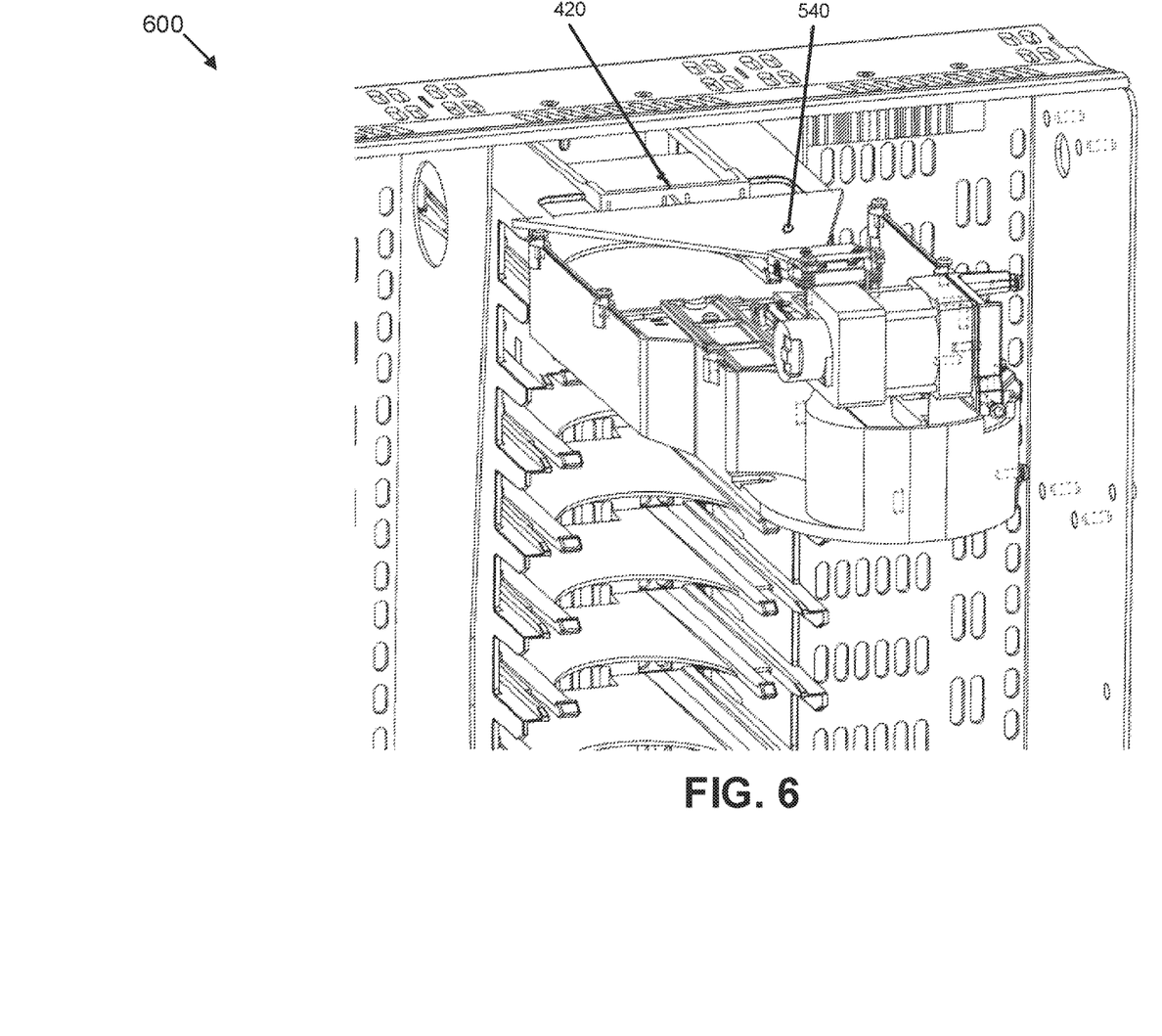
FIG. 6 shows an illustrative portion of a storage library system, such as the one shown in FIG. 2, with the line camera of the robotic assembly positioned to detect presence of the "N" target.

As described above, having made a preliminary determination with the proximity sensor 220 that a cartridge magazine 170 is present, the line camera 210 can be used to acquire additional optical information. The additional optical information can be used, for example, precisely to orient (e.g., position, align, etc.) the robotic assembly 120, to recognize the "N" target 420, to read and decode one or more cartridge barcode labels 430, etc. For the sake of added clarity, FIG. 6 shows an illustrative portion of a storage library system 600, such as the one shown in FIG. 2, with the line camera 210 of the robotic assembly 120 positioned to detect presence of the "N" target 420.

Figure 7:
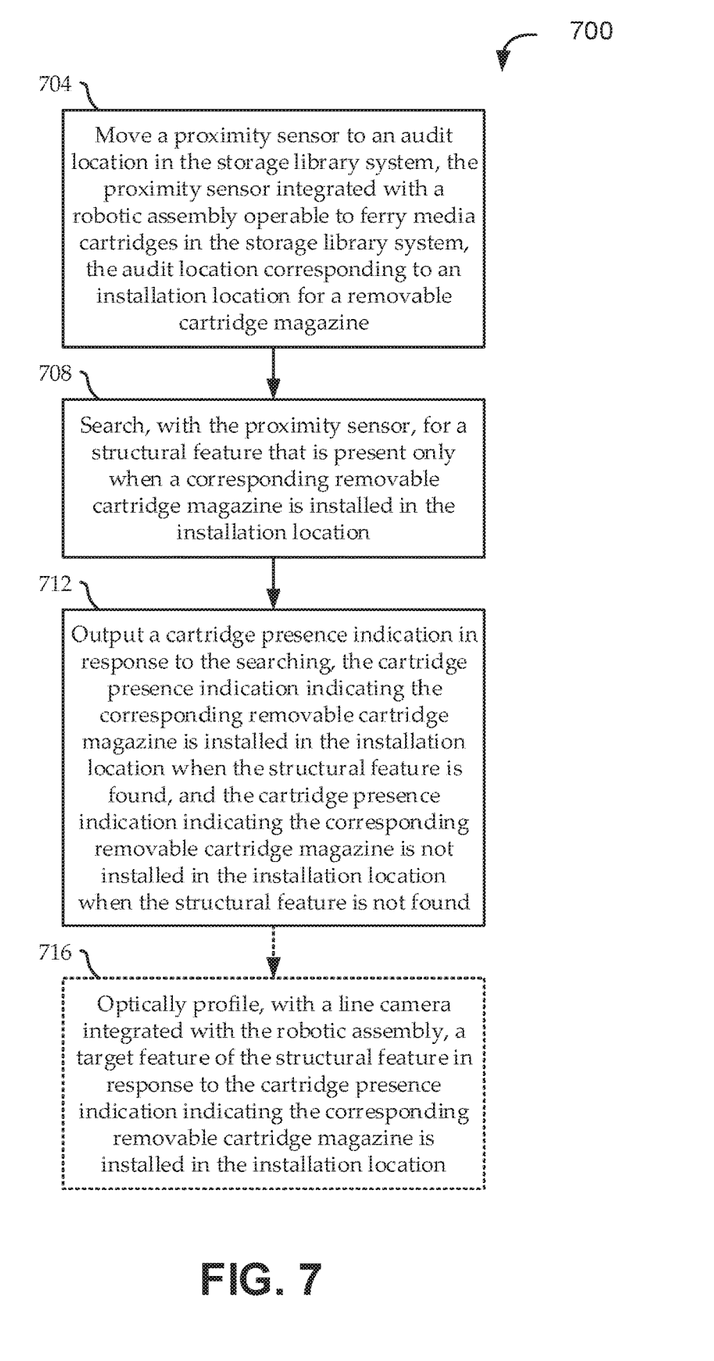
FIG. 7 shows a flow diagram of an illustrative method for auditing removable cartridge magazines in a storage library system, according to various embodiments.

FIG. 7 shows a flow diagram of an illustrative method 700 for auditing removable cartridge magazines in a storage library system, according to various embodiments. Some embodiments of the method 700 can operate in context of the systems described above with reference to FIGS. 1-6. Embodiments of the method 700 can begin at stage 704 by moving a proximity sensor to an audit location in the storage library system. The audit location can correspond to an installation location for a removable cartridge magazine (e.g., one of multiple locations in a storage wall). As described above, the proximity sensor can be integrated with a robotic assembly operable to ferry media cartridges in the storage library system.

At stage 708, embodiments can search, with the proximity sensor, for a structural feature that is present only when a corresponding removable cartridge magazine is installed in the installation location. For example, as described above, the structural feature can be integrated into the cartridge magazine (e.g., as a wall, or the like). In some implementations, searching for the structural feature can include transmitting an optical signal from an optical source of the proximity sensor and detecting receipt of the optical signal by an optical sink of the proximity sensor after reflection of the optical signal off an object in proximity to the proximity sensor. In some such instances, the searching further includes determining whether the optical signal is received by the optical sink at a magnitude exceeding a threshold level. For example, the threshold level can be set so that the magnitude of the received optical signal exceeds the threshold level only when the structural feature is present within a predefined distance range from the proximity sensor.

At stage 712, embodiments can output a cartridge presence indication in response to the searching at stage 708. The cartridge presence indication can indicate that the corresponding removable cartridge magazine is installed in the installation location when the structural feature is found; and the cartridge presence indication can indicate that the corresponding removable cartridge magazine is not installed in the installation location when the structural feature is not found. Some embodiments can perform further auditing related tasks in response to detecting presence of the cartridge magazine by the proximity sensor. For example, at stage 716, embodiments can optically profile (e.g., with a line camera integrated with the robotic assembly) a target feature (e.g., an "N" target) of the structural feature in response to the cartridge presence indication indicating the corresponding removable cartridge magazine is installed in the installation location.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by at least one of indicates a disjunctive list such that, for example, a list of "at least one of A, B. or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A system for auditing removable cartridge magazines in a storage library system, the system comprising:
   a robotic assembly operable to ferry media cartridges in the storage library system;
   a proximity sensor integrated with the robotic assembly, the robotic assembly being further operable to move the proximity sensor to search for a structural feature that is present when a corresponding removable cartridge magazine is installed in an installation location of the storage library system; and
   a processor having a proximity sensor input and a cartridge audit output,
   wherein the cartridge audit output indicates presence of the corresponding removable cartridge magazines in the installation location in response to detection of the structural feature by the proximity sensor,
   wherein the proximity sensor comprises an optical source to generate an optical transmission and an optical sink to receive the optical transmission after reflection of the optical transmission off an object in proximity to the proximity sensor,
   wherein the optical source and the optical sink are pointed so that the reflected optical transmission is received at a magnitude exceeding a threshold level only when an object is within a predefined distance range from the proximity sensor, and
   wherein the proximity sensor is integrated with the robotic assembly so that the structural feature is within the predefined distance range from the proximity sensor when the corresponding removable cartridge magazines in the installation location and the robotic assembly is substantially in an audit position.

2. The system of claim 1, wherein the cartridge audit output indicates presence of the corresponding removable cartridge magazines in the installation location in response to determining that the reflected optical transmission is received at a magnitude exceeding the threshold level.

3. The system of claim 1, wherein:
   the optical source comprises a light emitting diode (LED); and
   the optical sink comprises a photodetector.

4. The system of claim 1, wherein the structural feature is a feature of the removable cartridge magazine.

5. The system of claim 1, further comprising:
a line camera integrated with the robotic assembly, the robotic assembly being further operable to move the line camera to generate an optical profile of a target feature of the structural feature in response to the detection of the structural feature by the proximity sensor.

6. The system of claim 1, wherein the robotic assembly comprises a hand mechanism operable to insert media cartridges into, and remove media cartridges from, fixed cells of removable cartridge magazines installed in the storage library system.

7. The system of claim 1, wherein the processor is integrated with the robotic assembly.

8. The system of claim 1, further comprising:
a storage wall of the storage library having a plurality of cartridge magazine installation locations.

9. A method for auditing removable cartridge magazines in a storage library system, the method comprising:
moving a proximity sensor to an audit location in the storage library system, the proximity sensor integrated with a robotic assembly operable to ferry media cartridges in the storage library system, the audit location corresponding to an installation location for a removable cartridge magazine;
searching, with the proximity sensor, for a structural feature that is present only when a corresponding removable cartridge magazine is installed in the installation location; and
outputting a cartridge presence indication in response to the searching, the cartridge presence indication indicating the corresponding removable cartridge magazine is installed in the installation location when the structural feature is found, and the cartridge presence indication indicating the corresponding removable cartridge magazine is not installed in the installation location when the structural feature is not found,
wherein the searching comprises:
transmitting an optical signal from an optical source of the proximity sensor;
detecting receipt of the optical signal by an optical sink of the proximity sensor after reflection of the optical signal off an object in proximity to the proximity sensor; and
determining whether the optical signal is received by the optical sink at a magnitude exceeding a threshold level, the threshold level set so that the magnitude of the received optical signal exceeds the threshold level only when the structural feature is present within a predefined distance range from the proximity sensor.

10. The method of claim 9, further comprising:
optically profiling, with a line camera integrated with the robotic assembly, a target feature of the structural feature in response to the cartridge presence indication indicating the corresponding removable cartridge magazine is installed in the installation location.

11. A system for auditing removable cartridge magazines in a storage library system, the system comprising:
a processor in communication with a proximity sensor integrated with a robotic assembly operable to ferry media cartridges in the storage library system; and
a data store having instructions stored thereon, which, when executed, cause the processor to perform steps comprising:
searching, with the proximity sensor, for a structural feature that is present only when a corresponding removable cartridge magazine is installed in an installation location; and
outputting a cartridge presence indication in response to the searching, the cartridge presence indication indicating the corresponding removable cartridge magazine is installed in the installation location when the structural feature is found, and the cartridge presence indication indicating the corresponding removable cartridge magazine is not installed in the installation location when the structural feature is not found,
wherein the searching comprises:
transmitting an optical signal from an optical source of the proximity sensor;
detecting receipt of the optical signal by an optical sink of the proximity sensor after reflection of the optical signal off an object in proximity to the proximity sensor; and
determining whether the optical signal is received by the optical sink at a magnitude exceeding a threshold level, the threshold level set so that the magnitude of the received optical signal exceeds the threshold level only when the structural feature is present within a predefined distance range from the proximity sensor.

12. The system of claim 11, wherein the processor is further in communication with the robotic assembly, and the steps further comprise:
moving the proximity sensor to an audit location in the storage library system prior to the searching, the audit location corresponding to the installation location for the corresponding removable cartridge magazine.

13. The system of claim 11, wherein the steps further comprise:
optically profiling, with a line camera integrated with the robotic assembly, a target feature of the structural feature in response to the cartridge presence indication indicating the corresponding removable cartridge magazine is installed in the installation location.

14. The system of claim 11, wherein the processor is integrated with the robotic assembly.

15. A system for auditing removable cartridge magazines in a storage library system, the system comprising:
a robotic assembly operable to ferry media cartridges in the storage library system;
a proximity sensor integrated with the robotic assembly, the robotic assembly being further operable to move the proximity sensor to search for a structural feature that is present when a corresponding removable cartridge magazine is installed in an installation location of the storage library system;
a processor having a proximity sensor input and a cartridge audit output, wherein the cartridge audit output indicates presence of the corresponding removable cartridge magazines in the installation location in response to detection of the structural feature by the proximity sensor; and
a line camera integrated with the robotic assembly, the robotic assembly being further operable to move the line camera to generate an optical profile of a target feature of the structural feature in response to the detection of the structural feature by the proximity sensor.

16. The system of claim 15, wherein the structural feature is a feature of the removable cartridge magazine.

17. The system of claim 15, wherein the robotic assembly comprises a hand mechanism operable to insert media cartridges into, and remove media cartridges from, fixed cells of removable cartridge magazines installed in the storage library system.

18. The system of claim 15, wherein the processor is integrated with the robotic assembly.

19. The system of claim 15, further comprising a storage wall of the storage library having a plurality of cartridge magazine installation locations.

20. A method for auditing removable cartridge magazines in a storage library system, the method comprising:
- moving a proximity sensor to an audit location in the storage library system, the proximity sensor integrated with a robotic assembly operable to ferry media cartridges in the storage library system, the audit location corresponding to an installation location for a removable cartridge magazine;
- searching, with the proximity sensor, for a structural feature that is present only when a corresponding removable cartridge magazine is installed in the installation location;
- outputting a cartridge presence indication in response to the searching, the cartridge presence indication indicating the corresponding removable cartridge magazine is installed in the installation location when the structural feature is found, and the cartridge presence indication indicating the corresponding removable cartridge magazine is not installed in the installation location when the structural feature is not found; and
- optically profiling, with a line camera integrated with the robotic assembly, a target feature of the structural feature in response to the cartridge presence indication indicating the corresponding removable cartridge magazine is installed in the installation location.

21. The method of claim 20, wherein the searching comprises:
- transmitting an optical signal from an optical source of the proximity sensor; and
- detecting receipt of the optical signal by an optical sink of the proximity sensor after reflection of the optical signal off an object in proximity to the proximity sensor.

22. A system for auditing removable cartridge magazines in a storage library system, the system comprising:
- a processor in communication with a proximity sensor integrated with a robotic assembly operable to ferry media cartridges in the storage library system; and
- a data store having instructions stored thereon, which, when executed, cause the processor to perform steps comprising:
  - searching, with the proximity sensor, for a structural feature that is present only when a corresponding removable cartridge magazine is installed in an installation location;
  - outputting a cartridge presence indication in response to the searching, the cartridge presence indication indicating the corresponding removable cartridge magazine is installed in the installation location when the structural feature is found, and the cartridge presence indication indicating the corresponding removable cartridge magazine is not installed in the installation location when the structural feature is not found; and
  - optically profiling, with a line camera integrated with the robotic assembly, a target feature of the structural feature in response to the cartridge presence indication indicating the corresponding removable cartridge magazine is installed in the installation location.

23. The system of claim 22, wherein the processor is further in communication with the robotic assembly, and the steps further comprise:
- moving the proximity sensor to an audit location in the storage library system prior to the searching, the audit location corresponding to the installation location for the corresponding removable cartridge magazine.

24. The system of claim 22, wherein the processor is integrated with the robotic assembly.

* * * * *

UNITED STATES PATENT AND TRADEMARK OFFICE
CERTIFICATE OF CORRECTION

PATENT NO. : 10,217,081 B2
APPLICATION NO. : 15/081731
DATED : February 26, 2019
INVENTOR(S) : Christopher John Clos It is certified that error appears in the above-identified patent and that said Letters Patent is hereby corrected as shown below:

In the Specification

Column 3, Line 55, delete "hulk" and insert therefor --bulk--.

Column 3, Line 67, delete "terry" and insert therefor --ferry--.

Signed and Sealed this
Seventh Day of May, 2019

Andrei Iancu
*Director of the United States Patent and Trademark Office*